US012795440B2

(12) United States Patent
Hsu et al.

(10) Patent No.: US 12,795,440 B2
(45) Date of Patent: Nov. 10, 2026

(54) METHOD FOR COLLECTING BUFFER STATUS REPORTS THROUGH USING BUFFER STATUS REPORT POLL TRIGGER FRAME WITH EXTRA INDICATIONS

(71) Applicant: MEDIATEK INC., Hsin-Chu (TW)

(72) Inventors: Chien-Fang Hsu, Hsinchu City (TW); Hao-Hua Kang, Hsinchu City (TW); Chih-Chun Kuo, Hsinchu City (TW)

(73) Assignee: MEDIATEK INC., Hsinchu (TW)

( * ) Notice: Subject to any disclaimer, the term of this patent is extended or adjusted under 35 U.S.C. 154(b) by 29 days.

(21) Appl. No.: 18/129,080

(22) Filed: Mar. 31, 2023

(65) Prior Publication Data

US 2023/0328581 A1 Oct. 12, 2023

Related U.S. Application Data

(60) Provisional application No. 63/424,104, filed on Nov. 9, 2022, provisional application No. 63/328,773, filed on Apr. 8, 2022.

(51) Int. Cl.
*H04W 28/02* (2009.01)

(52) U.S. Cl.
CPC ............................... *H04W 28/0278* (2013.01)

(58) Field of Classification Search
CPC ................................................ H04W 28/0278
See application file for complete search history.

(56) References Cited

U.S. PATENT DOCUMENTS

| | | | | |
|---|---|---|---|---|
| 11,889,488 | B1 * | 1/2024 | Chu | H04L 1/1896 |
| 2003/0135640 | A1 * | 7/2003 | Ho | H04L 1/1671 709/237 |
| 2014/0079011 | A1 * | 3/2014 | Wiberg | H04W 72/52 370/329 |
| 2015/0288501 | A1 * | 10/2015 | Kwon | H04L 1/1614 370/329 |
| 2018/0020460 | A1 | 1/2018 | Hedayat | |
| 2019/0319738 | A1 * | 10/2019 | Ahn | H04W 28/065 |
| 2020/0128524 | A1 * | 4/2020 | Han | H04B 7/0695 |
| 2021/0227529 | A1 * | 7/2021 | Chu | H04W 72/23 |
| 2021/0307064 | A1 | 9/2021 | Ryu | |
| 2021/0360646 | A1 * | 11/2021 | Chu | H04W 72/569 |
| 2022/0022087 | A1 * | 1/2022 | Chu | H04W 28/0268 |
| 2022/0053560 | A1 | 2/2022 | Xin | |
| 2022/0361194 | A1 * | 11/2022 | Shafin | H04W 72/569 |
| 2023/0047705 | A1 * | 2/2023 | Xin | H04W 74/0808 |

(Continued)

FOREIGN PATENT DOCUMENTS

| | | | |
|---|---|---|---|
| WO | 2022/013437 | A1 | 1/2022 |
| WO | 2022/032150 | A1 | 2/2022 |

*Primary Examiner* — Faruk Hamza
*Assistant Examiner* — Tito Q Pham
(74) *Attorney, Agent, or Firm* — Winston Hsu

(57) ABSTRACT

A wireless communication method includes: generating a buffer status report poll (BSRP) trigger frame, wherein the BSRP trigger frame is configured to carry indication information of buffer status report (BSR) collection; sending the BSRP trigger frame to at least one non-access-point (non-AP) station (STA); and in response to receiving the BSRP trigger frame, generating at least one trigger-based (TB) physical layer (PHY) protocol data unit (PPDU), and sending the at least one TB PPDU to an access point (AP).

12 Claims, 5 Drawing Sheets

(56) References Cited

U.S. PATENT DOCUMENTS

| | | | | |
|---|---|---|---|---|
| 2023/0117842 | A1* | 4/2023 | Xin | H04W 28/0268 370/235 |
| 2024/0007896 | A1* | 1/2024 | Ryu | H04L 45/24 |
| 2024/0155717 | A1* | 5/2024 | Huang | H04W 76/15 |
| 2025/0048428 | A1* | 2/2025 | Lou | H04W 74/0866 |

* cited by examiner

METHOD FOR COLLECTING BUFFER STATUS REPORTS THROUGH USING BUFFER STATUS REPORT POLL TRIGGER FRAME WITH EXTRA INDICATIONS

CROSS REFERENCE TO RELATED APPLICATIONS

This application claims the benefit of U.S. Provisional Application No. 63/328,773, filed on Apr. 8, 2022. Further, this application claims the benefit of U.S. Provisional Application No. 63/424,104, filed on Nov. 9, 2022. The contents of these applications are incorporated herein by reference.

BACKGROUND

The present invention relates to wireless communications, and more particularly, to a method for collecting buffer status reports through using a buffer status report poll trigger frame with extra indications.

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within a wireless range of the AP to establish or maintain a communication link with the WLAN. WLANs that operate in accordance with the IEEE 802.11 family of standards are commonly referred to as Wi-Fi® networks.

The IEEE 802.11ax standard has introduced multiple access mechanisms, such as an orthogonal frequency division multiple access (OFDMA) mechanism, to allow multiple non-AP STAs to transmit or receive data on a shared wireless medium at the same time. For example, in a wireless network using OFDMA, the available frequency spectrum may be divided into a plurality of resource units (RUs) each including a number of different frequency subcarriers, and different RUs may be allocated or assigned to different wireless devices at a specific instant. In this manner, multiple wireless devices may concurrently transmit data on the wireless medium using their assigned RU or frequency subcarriers.

More specifically, an AP may allocate a unique set of RUs to each of a plurality of non-AP STAs to allow the non-AP STAs to concurrently transmit uplink (UL) data to the AP. Because different non-AP STAs may have different amounts of UL data waiting to be transmitted to the AP, it would be desirable if the AP can be aware of how much UL data each of the non-AP STAs has to transmit, for example, so that the AP may allocate adequate RUs to the non-AP STAs accordingly.

In current Wi-Fi systems, the AP can send a buffer status report poll (BSRP) trigger frame to collect buffer status report (BSR) from one or more non-AP STAs. For AP's scheduling, it is important to collect STA's buffer statues of traffic identifiers (TIDs) as much as possible, or to collect buffer statuses of certain TIDs of AP's interest only. However, if the AP does not support receiving a multi-TID aggregated media access control (MAC) protocol data unit (A-MPDU), i.e., multiple MAC frames with different TIDs that are aggregated in the same physical layer (PHY) packet, it can only collect a BSR of one TID at one time if quality of service (QoS) data frames are used for buffer status reporting. Also the non-AP STA may not report BSRs of TIDs of AP's interest, e.g., BSRs of latency sensitive TIDs. Those limitations may cause the AP needs to transmit the BSRP trigger frame several times to achieve the objective of collecting BSRs of multiple TIDs. Thus, there is a need for an innovative buffer status reporting design that enables the AP to collect BSRs of multiple TIDs at one time from one or more non-AP STAs.

SUMMARY

One of the objectives of the claimed invention is to provide a method for collecting buffer status reports (BSRs) through using a buffer status report poll (BSRP) trigger frame with extra indications.

According to a first aspect of the present invention, an exemplary wireless communication method is disclosed. The exemplary wireless communication method includes: generating a buffer status report poll (BSRP) trigger frame, wherein the BSRP trigger frame is configured to carry indication information of buffer status report (BSR) collection; and sending the BSRP trigger frame to at least one non-access-point (non-AP) station (STA).

According to second aspect of the present invention, an exemplary wireless communication method is disclosed. The exemplary wireless communication method includes: receiving a buffer status report poll (BSRP) trigger frame, wherein the BSRP trigger frame has indication information of buffer status report (BSR) collection; and in response to receiving the BSRP trigger frame, generating at least one trigger-based (TB) physical layer (PHY) protocol data unit (PPDU), and sending the at least one TB PPDU to an access point (AP).

According to a third aspect of the present invention, an exemplary wireless communication device is disclosed. The exemplary wireless communication device includes a wireless communication circuit and a control circuit. The control circuit is arranged to generate a buffer status report poll (BSRP) trigger frame, and instruct the wireless communication circuit to send the BSRP trigger frame to at least one non-access-point (non-AP) station (STA), wherein the BSRP trigger frame is configured to carry indication information of buffer status report (BSR) collection.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
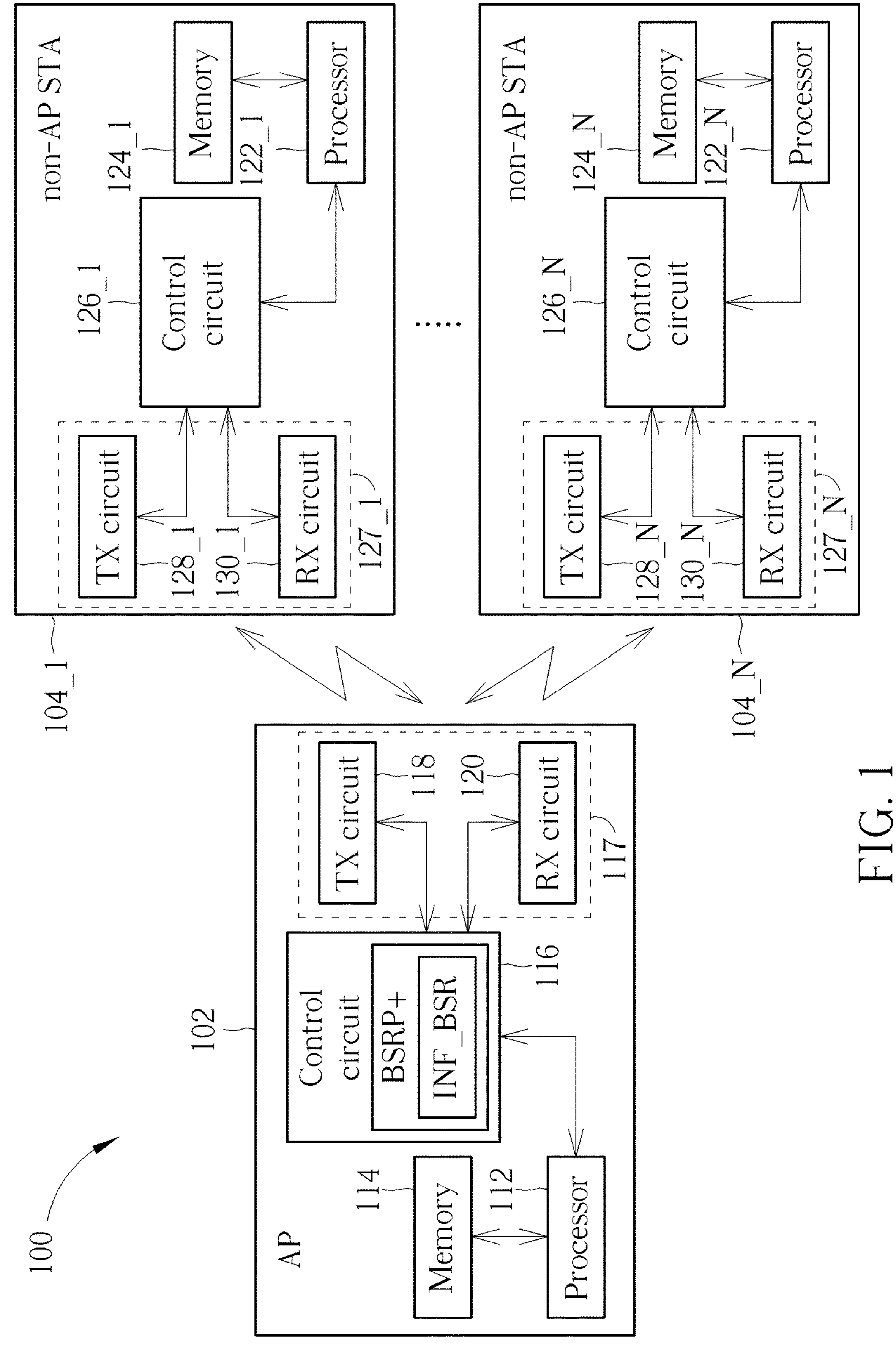
FIG. 1 is a diagram illustrating a Wi-Fi system according to an embodiment of the present invention.

FIG. 1 is a diagram illustrating a wireless fidelity (Wi-Fi) system according to an embodiment of the present invention. The Wi-Fi system 100 is an 802.11 wireless local area network (WLAN), and has a plurality of wireless communication devices, including an access point (AP) 102 and one or more non-AP stations (STAs) 104_1-104_N (N≥1). In one scenario, the AP 102 may communication with a single user such as the non-AP station 104_1. In another scenario, the AP 102 may communication with multiple users such as non-AP stations 104_1 and 104_N. For brevity and simplicity, only two non-AP STAs are illustrated. In practice, the Wi-Fi system 100 may include more than two non-AP STAs in the same Basic Service Set (BSS) of the AP 102. By way of example, but not limitation, the Wi-Fi system 100 may be a high efficiency (HE) WLAN (802.11ax), an extremely high throughput (EHT) WLAN (802.11be), or a WLAN complying with a future 802.11 standard.

As shown in FIG. 1, the AP 102 includes a processor 112, a memory 114, a control circuit 116, and a wireless communication circuit 117 including a transmitter (TX) circuit 118 and a receiver (RX) circuit 120. The non-AP STA 104_1/104_N includes a processor 122_1/122_N, a memory 124_1/124_N, a control circuit 126_1/126_N, and a wireless communication circuit 127_1/127_N including a TX circuit 128_1/128_N and a RX circuit 130_1/130_N. It should be noted that each wireless communication device may be equipped with one or more antennas (not shown), depending upon actual design considerations. Hence, each of the TX circuits 118, 128_1, 128_N may include one or more transmitters, and each of the RX circuits 120, 130_1, 130_N may include one or more receivers.

Regarding the AP 102, the memory 114 is arranged to store a program code, the processor 112 is arranged to load and execute the program code to manage the AP 102, and the control circuit 116 is arranged to control wireless communications with the non-AP STAs 104_1-104_N via the TX circuit 118 and the RX circuit 120 of the wireless communication circuit 117. Regarding the non-AP STA 104_1/104_N, the memory 124_1/124_N is arranged to store a program code, the processor 122_1/122_N is arranged to load and execute the program code to manage the non-AP STA 104_1/104_N, the control circuit 126_1/126_N is arranged to control wireless communications with the AP 102 via the TX circuit 128_1/128_N and the RX circuit 130_1/130_N of the wireless communication circuit 127_1/127_N.

In this embodiment, the control circuit 116 of the AP 102 is arranged to generate a proposed buffer status report poll (BSRP) trigger frame BSRP+, and send the proposed BSRP trigger frame BSRP+ to at least one non-AP STA (i.e., one or more of the non-AP STAs 104_1-104_N) through the wireless communication circuit 117 (particularly, TX circuit 118 of wireless communication circuit 117). The legacy BSRP trigger frame that does not carry extra indications for buffer status reporting. For example, the legacy BSRP trigger frame does not carry any traffic identifier (TID) information for collecting buffer status reports (BSRs) of requested TIDs from non-AP STA(s). To address this issue, the proposed BSRP trigger frame BSRP+ is configured by the control circuit 116 to carry indication information of BSR collection INF_BSR, which remedies the deficiency of legacy BSRP trigger frame. That is, extra indications carried by the proposed BSRP trigger frame BSRP+ are intended to inform a non-AP STA of how to deal with buffer status reporting to meet AP's need/request after the proposed BSRP trigger frame is received by the non-AP STA.

In a first exemplary design of the proposed BSRP trigger frame BSRP+, the indication information of BSR collection INF_BSR is set to indicate that the AP 102 intends to collect BSRs of multiple TIDs. For example, the indication information of BSR collection INF_BSR is set to further specify which TIDs are requested by the AP 102. Hence, if the AP 102 is interested in a buffer status of a specific TID, the indication information of BSR collection INF_BSR can be set to indicate that a BSR of the specific TID is requested by AP 102. For another example, the AP 102 sends the BSRP trigger frame BSRP+ to multiple users (e.g., non-AP STAs 104_1 and 104_N), requested TIDs of multiple non-AP STAs as indicated by the indication information of BSR collection INF_BSR can be the same or different. That is, in accordance with the indication information of BSR collection INF_BSR carried by the BSRP trigger frame BSRP+, requested TIDs of the non-AP STA 104_1 may be the same as requested TIDs of the non-AP STA 104_N, or requested TIDs of the non-AP STA 104_1 may be different from requested TIDs of the non-AP STA 104_N. To put it simply, the AP 102 can set the indication information of BSR collection INF_BSR in the BSRP trigger frame BSRP+ for instructing one non-AP STA 104_1 to report statues of buffers of a first set of TIDs on the non-AP STA 104_1, and instructing another non-AP STA 104_N to report statues of buffers of a second set of TIDs on the non-AP STA 104_N, where the first set of TIDs may be identical to or different from the second set of TIDs. For yet another example, the indication information of BSR collection INF_BSR may include a single bit that is set to indicate that BSRs of all TIDs (e.g., BSRs of 8 TIDs associated with access categories AC_VO (Voice), AC_VI (Video), AC_BE (Best Effort), and AC_BK (Background)) are requested by the AP 102. If the AP 102 wants to know buffer statuses of all TIDs on multiple non-AP STAs 104_1-104_N, the single bit included in the indication information of BSR collection INF_BSR can be set by a bit value "1" for instructing each of the non-AP STAs to report its buffer statues of all TIDs (e.g., BSRs of 8 TIDs associated with AC_VO, AC_VI, AC_BE, and AC_BK). Similarly, if the AP 102 wants to know buffer statuses of all TIDs on a single non-AP STA (e.g., non-AP STA 104_1), the single bit included in the indication information of BSR collection INF_BSR can be set by a bit value "1" for instructing the single non-AP STA to report its buffer statues of all TIDs (e.g., BSRs of 8 TIDs associated with AC_VO, AC_VI, AC_BE, and AC_BK).

In a second exemplary design of the proposed BSRP trigger frame BSRP+, the indication information of BSR collection INF_BSR is set to indicate that the AP 102 is capable of receiving BSRs of multiple TIDs in an aggregated media access control (MAC) protocol data unit (A-MPDU). Since the AP 102 has the multi-TID A-MPDU support, the buffer status reporting can be achieved through using a multi-TID A-MPDU having one QoS Data frame aggregated with multiple QoS Null frames, where each of the multiple QoS Null frames has a MAC header that carries a BSR of a specific TID, and the QoS Data frame can have a frame body that carries QoS data. Alternatively, the buffer status reporting can be achieved through using a multi-TID A-MPDU having only QoS Null frames aggregated therein. To put it simply, after receiving the BSRP trigger frame BSRP+ sent from the AP 102, the non-AP STA 104_1/104_N is informed of the multi-TID A-MPDU capability of the AP 102. The non-AP STA 104_1/104_N is allowed to send BSRs of multiple TIDs to the AP 102 via a multi-TID A-MPDU (which includes one QoS data frame and multiple QoS Null frames) after being informed of the multi-TID A-MPDU support of the AP 102. Alternatively, the non-AP STA 104_1/104_N is allowed to send BSRs of multiple TIDs to the AP 102 via a multi-TID A-MPDU (which includes QoS Null frames only), regardless of the multi-TID A-MPDU support of the AP 102.

In a third exemplary design of the proposed BSRP trigger frame BSRP+, the indication information of BSR collection INF_BSR is set to indicate which response format should be used for buffer status reporting. For example, each of AP 102 and non-AP STAs 104_1-104_N may support a plurality of response formats, including a first response format (which is indicative of the use of an A-MPDU carrying multiple QoS null frames, each having a MAC header that carries a BSR of a specific TID) and a second response format (which is indicative of the use of a frame without TID indication in a MAC header and with a BSR of at least one TID in a frame body).

Figure 2:
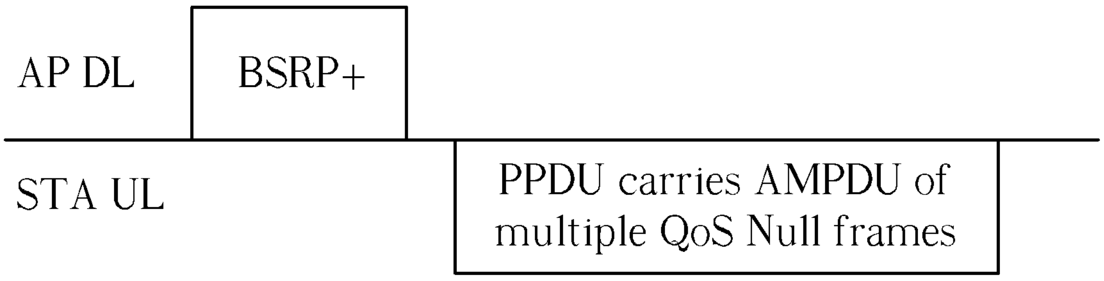
FIG. 2 is a diagram illustrating an AP-triggered BSRP/BSR transaction (Solicited BSR) case where the AP sends the BSRP trigger frame BSRP+ to a single non-AP STA via DL transmission and the non-AP STA employs the first response format for buffer status reporting via UL transmission.
Figure 3:
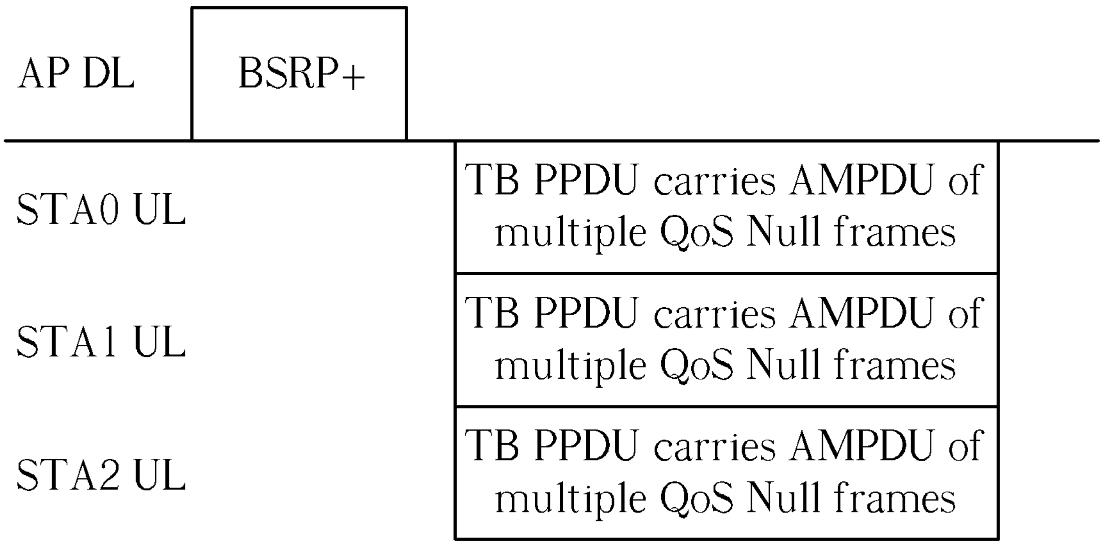
FIG. 3 is a diagram illustrating an AP-triggered BSRP/BSR transaction (Solicited BSR) case where the AP sends the BSRP trigger frame BSRP+ to multiple non-AP STAs via DL transmission and each of the multiple non-AP STAs employs the first response format for buffer status reporting via UL transmission.

When a non-AP STA (e.g., non-AP STA 104_1/104_N) receives the BSRP trigger frame BSRP+ with the indication information of BSR collection INF_BSR indicating that the first response format should be used for buffer status reporting, the non-AP STA (e.g., control circuit 126_1/126_N of non-AP STA 104_1/104_N) generates at least one trigger-based (TB) physical layer (PHY) protocol data unit (PPDU), and sends the TB PPDU(s) to the AP 102 through the wireless communication circuit (e.g., TX circuit 128_1/128_N of wireless communication circuit 127_1/127_N), where each TB PPDU includes an A-MPDU carrying multiple QoS Null frames, each having a MAC header that carries a BSR of a specific TID. Alternatively, in addition to multiple QoS Null frames, the A-MPDU may have one QoS Data frame aggregated therein. FIG. 2 is a diagram illustrating an AP-triggered BSRP/BSR transaction (Solicited BSR) case where the AP 102 sends the BSRP trigger frame BSRP+ to a single non-AP STA (i.e., single user) via downlink (DL) transmission and the non-AP STA employs the first response format for buffer status reporting via uplink (UL) transmission. FIG. 3 is a diagram illustrating an AP-triggered BSRP/BSR transaction (Solicited BSR) case where the AP 102 sends the BSRP trigger frame BSRP+ to multiple non-AP STAs (i.e., multiple users STA0, STA1, STA2) via DL transmission and each of the multiple non-AP STAs employs the first response format for buffer status reporting via UL transmission.

When a non-AP STA (e.g., non-AP STA 104_1/104_N) receives the BSRP trigger frame BSRP+ with the indication information of BSR collection INF_BSR indicating that the second response format should be used for buffer status reporting, the non-AP STA (e.g., control circuit 126_1/126_N of non-AP STA 104_1/104_N) generates TB PPDU(s), and sends the TB PPDU(s) to the AP 102 through the wireless communication circuit (e.g., TX circuit 128_1/128_N of wireless communication circuit 127_1/127_N), where each TB PPDU includes a MAC frame (i.e., MPDU) without TID information in a MAC header and with a BSR of at least one TID in a frame body. That is, one or more BSRs of corresponding TIDs are carried in a frame body of a MAC frame rather than a header of the MAC frame. The non-AP STA (e.g., non-AP STA 104_1/104_N) is allowed to perform buffer status reporting in an unsolicited way, that is, non-TB buffer status reporting. Hence, the non-AP STA (e.g., control circuit 126_1/126_N of non-AP STA 104_1/104_N) may generates PPDU(s), and sends the PPDU(s) to the AP 102 through the wireless communication circuit (e.g., TX circuit 128_1/128_N of wireless communication circuit 127_1/127_N), where each PPDU includes a MAC frame (i.e., MPDU) without TID information in a MAC header and with a BSR of at least one TID in a frame body.

Figure 4:
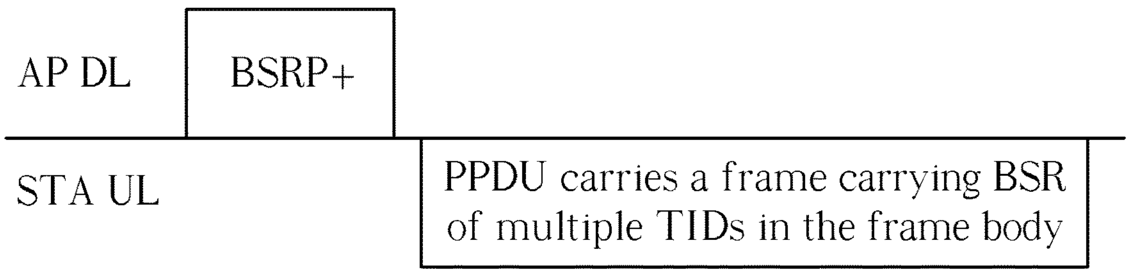
FIG. 4 is a diagram illustrating an AP-triggered BSRP/BSR transaction (Solicited BSR) case where the AP sends the BSRP trigger frame BSRP+ to a single non-AP STA via DL transmission and the non-AP STA employs the second response format for buffer status reporting via UL transmission.
Figure 5:
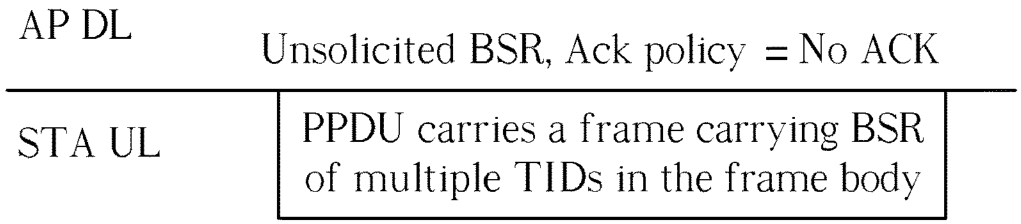
FIG. 5 is a diagram illustrating an STA report (Unsolicited BSR) case where a single non-AP STA (i.e., single user) employs the second response format for buffer status reporting via UL transmission.
Figure 6:
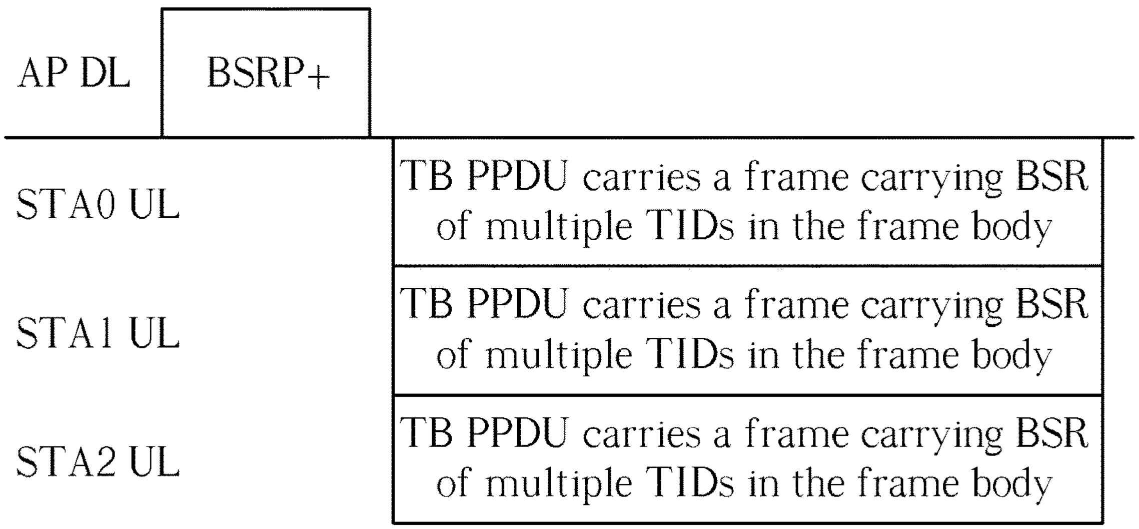
FIG. 6 is a diagram illustrating an AP-triggered BSRP/BSR transaction (Solicited BSR) case where the AP sends the BSRP trigger frame BSRP+ to multiple non-AP STAs via DL transmission and each of the multiple non-AP STAs employs the second response format for buffer status reporting via UL transmission.

FIG. 4 is a diagram illustrating an AP-triggered BSRP/BSR transaction (Solicited BSR) case where the AP 102 sends the BSRP trigger frame BSRP+ to a single non-AP STA (i.e., single user) via DL transmission and the non-AP STA employs the second response format for buffer status reporting via UL transmission. FIG. 5 is a diagram illustrating an STA report (Unsolicited BSR) case where a single non-AP STA (i.e., single user) employs the second response format for buffer status reporting via UL transmission. FIG. 6 is a diagram illustrating an AP-triggered BSRP/BSR transaction (Solicited BSR) case where the AP 102 sends the BSRP trigger frame BSRP+ to multiple non-AP STAs (i.e., multiple users STA0, STA1, STA2) via DL transmission and each of the multiple non-AP STAs employs the second response format for buffer status reporting via UL transmission.

Figure 7:
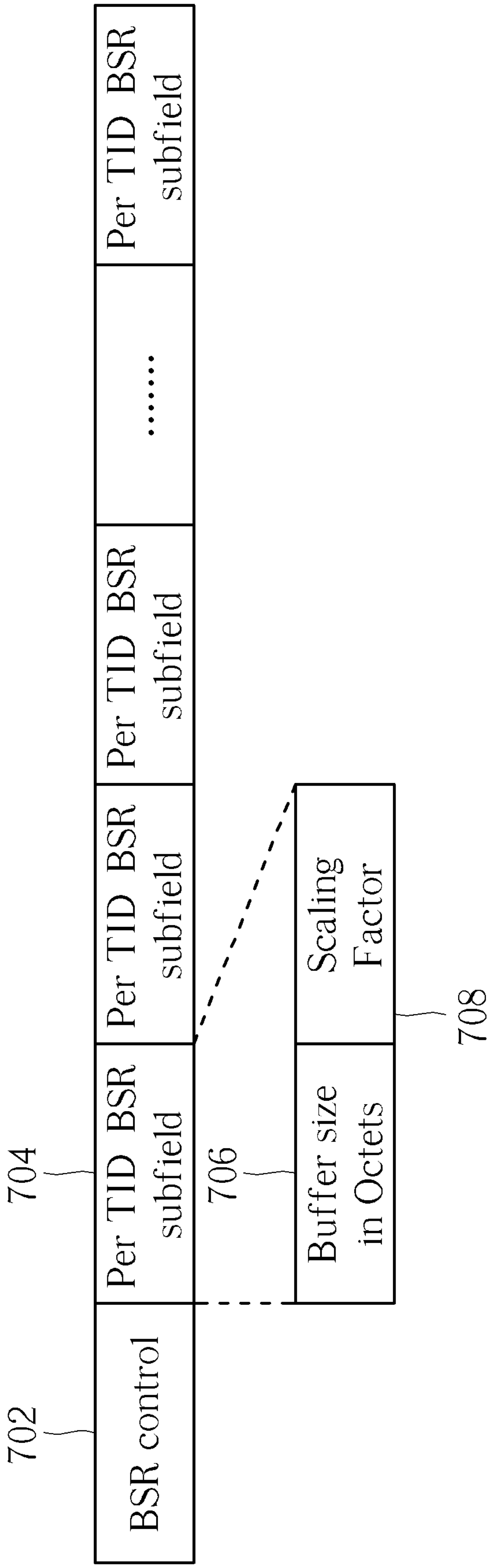
FIG. 7 is a diagram illustrating a first BSR format which is a part of a frame body format employed by a MAC frame according to an embodiment of the present invention.

When the second response format is selected, BSRs of corresponding TIDs are carried in a frame body of a MAC frame rather than a header of the MAC frame. The present invention further proposes some BSR formats that enable the frame body to carry BSRs of multiple TIDs. FIG. 7 is a diagram illustrating a first BSR format which is a part of a frame body format employed by a MAC frame according to an embodiment of the present invention. The frame body carries a BSR Control subfield 702 and a plurality of Per TID BSR subfields 704. The BSR Control subfield 702 indicates which TIDs are presented in the Per TID BSR subfields 704. For example, the BSR Control subfield 702 may include an 8-bit bitmap used to indicate existence of 8 TIDs (TID 0-TID 7), respectively. That is, the BSR Control subfield 702 may be used to indicate the TIDs for which the buffer status is reported. If an $n^{th}$ bit is set by a bit value "1", it indicates that a BSR of an $n^{th}$ TID is carried by one Per TID BSR subfields 704 included in the same frame body. If the $n^{th}$ bit is set by a bit value "0", it indicates than none of Per TID BSR subfields 704 included in the same frame body carries a BSR of an $n^{th}$ TID. Each Per TID BSR subfield 704 includes a Buffer Size subfield and a Scaling Factor subfield for indicating a buffer status of a non-zero buffer of a corresponding TID. Specifically, the Scaling Factor subfield indicates a scaling factor of a buffer size indicated by the Buffer Size subfield. The Per TID BSR subfields 704 are sequentially appended to the BSR Control subfield 702 in an order of TID 0-TID 7 (if that TID has a non-zero buffer). For example, if the buffer of TID 0, the buffer of TID 4, and the buffer of TID 7 are not empty, the BSR Control subfield 702 may record "10001001", and three Per TID BSR subfields 704 are sequentially appended to the BSR Control subfield 702, where the head Per TID BSR subfield 704 carries a BSR of TID 0, the middle Per TID BSR subfield 704 carries a BSR of TID 4, and the tail Per TID BSR subfield 704 carries a BSR of TID 7. However, this is for illustrative purposes only, and is not meant to be a limitation of the present invention.

Figure 8:
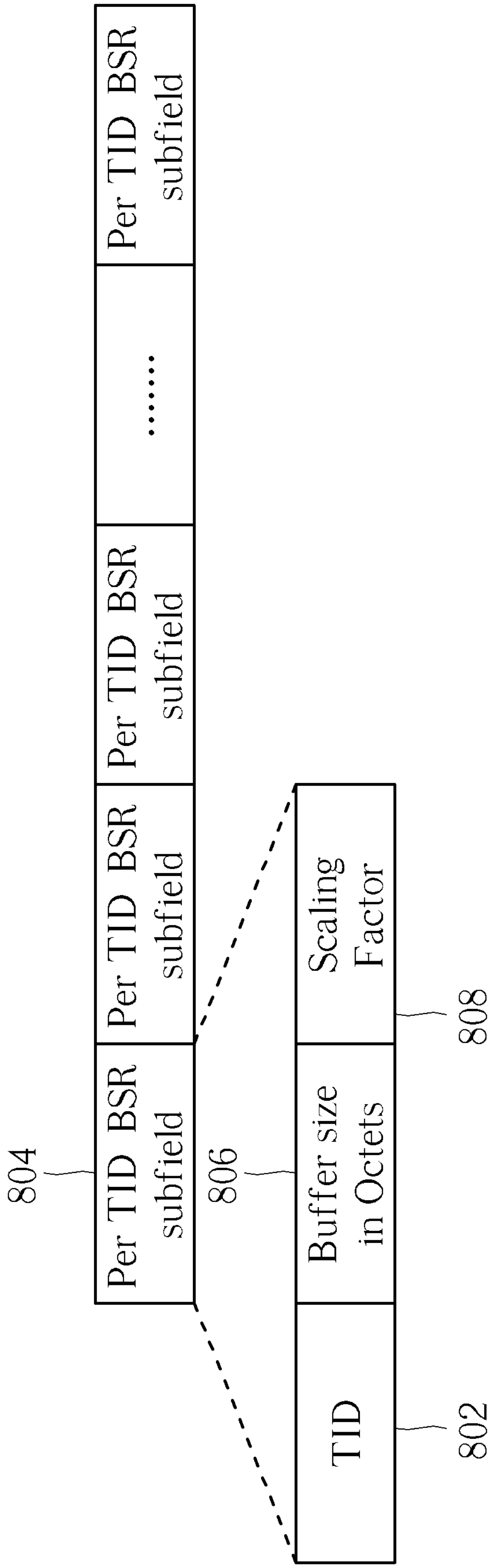
FIG. 8 is a diagram illustrating a second BSR format which is a part of a frame body format employed by a MAC frame according to an embodiment of the present invention.

FIG. 8 is a diagram illustrating a second BSR format which is a part of a frame body format employed by a MAC frame according to an embodiment of the present invention. In this embodiment, the aforementioned BSR Control subfield is omitted. The frame body carries a plurality of Per TID BSR subfields 804, and each of the Per TID BSR subfields 804 includes a TID subfield 802, a Buffer Size subfield 806, and a Scaling Factor subfield 808. A TID subfield 802 of a specific Per TID BSR subfield 804 indicates which TID is presented in the specific Per TID BSR subfield 804, and a buffer size subfield 806 and a scaling factor 808 of the same specific Per TID BSR subfield 804 are used to indicate a buffer status of a non-zero buffer of a corresponding TID. Specifically, the TID subfield 802 indicates the TID for which the buffer status is reported, and the Scaling Factor subfield indicates a scaling factor of a buffer size indicated by the Buffer Size subfield.

In addition to the BSR formats shown in FIG. 7 and FIG. 8, other options for carrying BSRs of multiple TIDs in the frame are feasible. For example, a new information element (IE) can be defined to carry BSRs of multiple TIDs, and the frame body can be used to carry the new IE.

As mentioned above, a non-AP STA (e.g., non-AP STA 104_1/104_N) may perform TB or non-TB buffer status reporting. It is possible that the non-AP STA (e.g., non-AP STA 104_1/104_N) has one empty buffer of a specific TID or multiple empty buffers of different TIDs. The present invention further proposes some empty buffer status rules to simplify the BSR delivery from the non-AP STA (e.g., non-AP STA 104_1/104_N) to the AP 102. For example, the empty buffer status rules can be employed under a condition that the indication information of BSR collection INF_BSR indicates that BSRs of all TID's are requested by the AP 102. In accordance with a first empty buffer status rule, if there is an empty buffer of a specific TID, a BSR of the specific TID may be skipped in a TB PPDU generated in response to the BSRP trigger frame BSRP+. In accordance with a second empty buffer status rule, if buffers of all TIDs are empty, only a single BSR that indicates a zero buffer size of a specific TID (which may be any TID selected from all TIDs) is reported via a TB PPDU that is generated in response to the BSRP trigger frame BSRP+.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method comprising:

generating a buffer status report poll (BSRP) trigger frame, wherein the BSRP trigger frame is configured to carry indication information of buffer status report (BSR) collection; and sending the BSRP trigger frame to at least one non-access-point (non-AP) station (STA);

wherein the indication information of BSR collection is set to indicate which response format is used; a response format indicated by the indication information of BSR collection is selected from a plurality of response formats comprising a first response format and a second response format; the first response format is indicative of the use of an aggregated media access control (MAC) protocol data unit (A-MPDU) carrying multiple quality of service (QoS) null frames, each having a MAC header that carries a BSR of a specific traffic identifier (TID); and the second response format is indicative of the use of a frame without TID indication in a MAC header and with a BSR of at least one TID in a frame body.

2. The wireless communication method of claim 1, wherein the indication information of BSR collection is set to further specify which TIDs are requested by an access point (AP).

3. The wireless communication method of claim 2, wherein sending the BSRP trigger frame to at least one non-AP STA comprises:

sending the BSRP trigger frame to multiple non-AP STAs, wherein the multiple non-AP STAs comprise a first non-AP STA and a second non-AP STA;

wherein in accordance with the indication information of BSR collection, requested TIDs of the first non-AP STA are the same as requested TIDs of the second non-AP STA.

4. The wireless communication method of claim 2, wherein sending the BSRP trigger frame to at least one non-AP STA comprises:

sending the BSRP trigger frame to multiple non-AP STAs, wherein the multiple non-AP STAs comprise a first non-AP STA and a second non-AP STA;

wherein in accordance with the indication information of BSR collection, requested TIDs of the first non-AP STA are different from requested TIDs of the second non-AP STA.

5. The wireless communication method of claim 1, wherein the indication information of BSR collection comprises a single bit that is set to indicate that BSRs of all TIDs are requested by an access point (AP).

6. The wireless communication method of claim 1, wherein the indication information of BSR collection is set to indicate that an access point (AP) is capable of receiving BSRs of multiple TIDs in an A-MPDU.

7. A wireless communication method comprising:

receiving a buffer status report poll (BSRP) trigger frame; and in response to receiving the BSRP trigger frame, generating at least one trigger-based (TB) physical layer (PHY) protocol data unit (PPDU), and sending said at least one TB PPDU to an access point (AP);

wherein each of said at least one TB PPDU includes a media access control (MAC) frame without traffic identifier (TID) indication in a MAC header and with a buffer status report (BSR) of at least one TID in a frame body, the frame body carries a BSR control subfield and a plurality of Per TID BSR subfields, the BSR control subfield indicates which TIDs are present in the plurality of Per TID BSR subfields, and each of the plurality of Per TID BSR subfields comprises a buffer size subfield and a scaling factor subfield.

8. The wireless communication method of claim 7, wherein the BSRP trigger frame indicates that BSRs of all TIDs are requested by the AP; and in response to an empty buffer of a specific TID, a BSR of the specific TID is skipped in said at least one TB PPDU.

9. The wireless communication method of claim 7, wherein the BSRP trigger frame indicates that BSRs of all TIDs are requested by the AP; and in response to empty buffers of all TIDs, only a single BSR that indicates a zero buffer size of a specific TID is reported via said at least one TB PPDU.

10. A wireless communication method comprising:

receiving a buffer status report poll (BSRP) trigger frame; and in response to receiving the BSRP trigger frame, generating at least one trigger-based (TB) physical layer (PHY) protocol data unit (PPDU), and sending said at least one TB PPDU to an access point (AP);

wherein each of said at least one TB PPDU includes a media access control (MAC) frame without traffic identifier (TID) indication in a MAC header and with a buffer status report (BSR) of at least one TID in a frame body, the frame body carries a plurality of Per TID BSR subfields, and each of the plurality of Per TID BSR subfields comprises a TID subfield, a buffer size subfield, and a scaling factor subfield.

11. A wireless communication device comprising:

a wireless communication circuit; and a control circuit, arranged to generate a buffer status report poll (BSRP) trigger frame, and instruct the wireless communication circuit to send the BSRP trigger frame to at least one non-access-point (non-AP) station (STA), wherein the BSRP trigger frame is configured to carry indication information of buffer status report (BSR) collection;

wherein the indication information of BSR collection is set to indicate which response format is used; a response format indicated by the indication information of BSR collection is selected from a plurality of response formats comprising a first response format and a second response format; the first response format is indicative of the use of an aggregated media access control (MAC) protocol data unit (A-MPDU) carrying multiple quality of service (QoS) null frames, each having a MAC header that carries a BSR of a specific traffic identifier (TID); and the second response format is indicative of the use of a frame without TID indication in a MAC header and with a BSR of at least one TID in a frame body.

12. The wireless communication device of claim 11, wherein the control circuit is further arranged to receive at least one trigger-based (TB) physical layer (PHY) protocol data unit (PPDU) through the wireless communication circuit, and said at least one TB PPDU is sent from said at least one non-AP STA in response to the BSRP trigger frame.

* * * * *